United States Patent
Von Fay et al.

(10) Patent No.: US 6,858,075 B1
(45) Date of Patent: Feb. 22, 2005

(54) THIN CONCRETE REPAIR COMPOSITION FOR ALKALI-AGGREGATE REACTION AFFECTED CONCRETE

(75) Inventors: Kurt F. Von Fay, Morrison, CO (US); William F. Kepler, Golden, CO (US)

(73) Assignee: The United States of America as represented by the Department of the Interior, Bureau of Reclamation, Washington, DC (US)

( * ) Notice: Subject to any disclaimer, the term of this patent is extended or adjusted under 35 U.S.C. 154(b) by 0 days.

(21) Appl. No.: 10/774,448

(22) Filed: Feb. 10, 2004

(51) Int. Cl.$^7$ .................. C04B 14/06; C04B 14/00; C04B 14/48
(52) U.S. Cl. .................. 106/737; 106/643; 106/711; 106/717; 106/724; 106/802; 106/814; 106/819; 106/823
(58) Field of Search ................... 106/643, 711, 106/717, 724, 737, 802, 814, 819, 823

(56) References Cited

U.S. PATENT DOCUMENTS

| | | | | |
|---|---|---|---|---|
| 4,313,763 A | * | 2/1982 | Turpin, Jr. ............ | 106/679 |
| 4,357,166 A | * | 11/1982 | Babcock ............... | 106/650 |
| 4,373,956 A | * | 2/1983 | Rosskopf .............. | 106/725 |
| 5,997,632 A | * | 12/1999 | Styron ................. | 106/705 |
| 6,251,178 B1 | * | 6/2001 | Styron ................. | 106/709 |
| 6,482,258 B2 | * | 11/2002 | Styron ................. | 106/709 |
| 2004/0040474 A1 | * | 3/2004 | Perez-Pena et al. ...... | 106/808 |

FOREIGN PATENT DOCUMENTS

JP          07-300357      * 11/1995

* cited by examiner

*Primary Examiner*—Anthony J. Green
(74) *Attorney, Agent, or Firm*—Stites & Harbison PLLC; Ross F. Hunt, Jr.

(57) ABSTRACT

A cement repair composition is provided for repairing thin concrete. The composition comprises, in weight percentages: fine aggregates, 50–80%; Portland cement, 10–20%; reinforcing fibers such as polyethylene, steel and fiberglass fibers, 0–5%; and a plurality of further additives. The additives preferably include a lithium admixture, an air entraining admixture and a water reducing chemical additive, and a shrinkage compensating chemical additive, in a combined weight percentage of 0.01 to 5%.

14 Claims, No Drawings

THIN CONCRETE REPAIR COMPOSITION FOR ALKALI-AGGREGATE REACTION AFFECTED CONCRETE

BACKGROUND OF THE INVENTION

1. Field of the Invention

The present invention relates to repair materials for concrete, and more particularly, to improved concrete repair materials containing fine aggregates, cement, and special chemical additives.

2. Related Art

Concrete structures and surfaces often develop cracks from environmental stresses, load stresses, and shrinkage during curing. For functional and/or aesthetic reasons, it is often desirable to repair these cracks. However, current repair systems are often considered temporary and suffer from problems including thermal incompatibility with the parent concrete, and re-cracking. More specifically, conventional thin concrete repair materials and systems are generally polymer-based or cementitious materials-based. Unfortunately, many of these systems fail after only a few years of service. Polymer-based systems do not generally perform well in an outdoor environment because of the thermal incompatibility of such systems with concrete, and frequently de-bond after a few years of exposure. Many cementitious systems have also been examined and have been found to not perform adequately. In this regard, many repairs using these materials crack or become de-bonded after exposure to actual field conditions, or deteriorate from other environmental causes, thereby leading to premature failure of the repair.

Another problem that must be faced in repairing thin surface defects in concrete structures is the effect of alkali aggregate reaction. This reaction causes a form of deterioration in the concrete structure resulting from a reaction between some types of cement and certain aggregates.

SUMMARY OF THE INVENTION

According to the invention, there is provided an improved concrete repair material which provides a number of advantages over the prior art particularly with respect to making repairs to thin surface defects in concrete structures located in outside environments. The repair material of the invention is less prone to cracking during hydration and, although of particular value in outdoor environments, is suitable for repairing concrete in both indoor and outdoor applications. Further, the repair material enables effective repairs to be made to thin surface defects in concrete structures that are experiencing or have undergone alkali-aggregate reaction.

In accordance with the invention, there is provided a cement repair material composition comprising, in weight percentages, fine aggregates selected from the group consisting of natural sand, manufactured sand and combinations thereof, 50–80%; cement, 10–20%; reinforcing fibers, 0–5%; and further additives at least including a lithium admixture. Preferably, the further additives comprise lithium, 0.005 to 0.05%; an air entraining admixture, 0.005 to 0.05%; a first chemical additive selected from the group consisting of water-reducing admixtures, set retarding admixtures, water-reducing set retarding admixtures, high-range water-reducing admixtures, and high-range water-reducing set retarding admixtures, 0.005% to 0.05%; and a second, shrinkage compensating chemical additive, 0.005 to 0.05%.

The cement preferably comprises Portland cement.

Preferably, the reinforcing fibers, if present, are selected from the group consisting of ceramic fibers, carbon fibers, polyethylene fibers, steel fibers, and fiberglass fibers.

Preferably, the second chemical additive comprises a drying shrinkage reducing admixture.

Advantageously, the cement repair material composition further comprises a mineral admixture. The mineral admixture is preferably selected from the group consisting of coal ash, calcined natural pozzolan, and silica fume. In a preferred embodiment, the mineral admixture comprises silica fume. Advantageously, the mineral admixture is present in an amount by weight from 0% to 3.5%.

In a further preferred embodiment of the cement repair material composition of the invention the fine aggregates are present in an amount by weight from 60% to 80%; the cement is present in an amount by weight from 15% to 18%; the lithium is present in an amount of 0.005 to 0.5%, the air entraining admixture is present in an amount 0.005 to 0.5%, the water-reducing chemical additive is present in an amount by weight from 0.005% to 0.05%; and the shrinkage compensation chemical additive is present in an amount by weight from 0.005% to 0.05%.

Other objects, features, and advantages of the present invention will be set forth in, or will become apparent from, the detailed description of the preferred embodiments of the invention which follows.

DESCRIPTION OF THE PREFERRED EMBODIMENTS

As indicated above, according to the invention, there is provided a cement mixture for repairing cracks in concrete. The mixture is formulated to allow for rapid strength gain and to be thermally compatible with the parent concrete. As explained below, reinforcing fibers and special chemical additives prevent the cracking that is typical of most cementitious repair materials. As was also indicated above, one important feature of thin concrete repair material of the invention is that the material can be used in making effective repairs of surface cracks and defects that have been the result of an alkali-aggregate reaction.

The type of cement used is chosen based on the application environment of the repair material. The American Society for Testing and Materials (ASTM) has created standards for a variety of materials, including cement, aggregates, and mineral admixtures. The standards specify acceptable compositions and physical properties for a given material. The ASTM also classifies the materials into various types meeting a particular standard.

In a preferred embodiment, Portland cement is used. Advantageously, the cement meets the standards of ASTMC 1157, type GU, "Standard Performance Specification for Blended Hydraulic Cement, with a Blaine Fineness (ASTMC 204) under 290, a tricalcium silicate content of less than 60%, a tricalcium aluminate content of about 6% and an alkali content less than 0.6%.

As indicated above, the thin concrete repair uses a large amount (50 to 80%) of fine aggregates. The fine aggregates preferably comprise natural sand, manufactured sand and combinations thereof, in accordance with ASTM C33.

In some preferred embodiments, reinforcing fibers are utilized in the repair mixture to prevent the formation of micro-cracks. The fiber material is chosen based on the application conditions and preferably comprises fibers selected from the group consisting of ceramic fibers, carbon fibers, polyethylene fibers, steel fibers, and fiberglass fibers.

A lithium admixture is also used in the repair material and is particularly effective in reducing and/or eliminating alkali-aggregate reaction. The lithium admixture is a commercially available product.

An air entraining admixture is used in a preferred embodiment. Any entraining admixture which meets the standards of ASTM C260 ("Air Entraining Admixture for Concrete") can be used.

As indicated above, the repair material preferably includes further chemical admixtures. ASTM C 494 is a standard specification for concrete chemical admixtures. ASTM chemical admixtures are divided into seven types. Type A comprise water-reducing admixtures, Type B comprise set retarding admixtures, Type C comprise accelerating admixtures, Type D comprise water reducing set retarding admixtures, Type E comprise water-reducing high-range admixtures, and Type F comprise water-reducing high-range set retarding admixtures. One of the chemical admixtures of the concrete repair material of the invention preferably meets ASTM C 494 and can be any of these types and, more preferably, is a Type A admixture.

A further chemical additive comprises a commercially available drying, shrinkage reducing admixture. Conventional concrete will shrink during drying and cause the formation of cracks. Commercially available shrinkage reducing admixtures have been developed combat this problem and the concrete repair material of the invention preferably includes one of these admixtures.

In some preferred embodiments, a mineral admixture is used. ASTM C 618 is a standard specification for coal ash and raw or calcined natural pozzolan for use as mineral admixtures in concrete, and these are the preferred mineral admixtures.

ASTM C 1240 is a standard specification for silica fume for use as an additional mineral admixture in hydraulic cement concrete, mortar, and grout.

One or more optional mineral admixtures can be used in the repair material and are preferably selected from those meeting ASTM C 618 or ASTM C 1240.

EXAMPLE I

In this example, and in the one that follows, only one of the three cement types will be used in the formulation, depending on the intended use and application. As indicated above, for many applications, Portland cement is preferred. The specific formulation for this example is as follows.

| Material | Percentage by Weight |
| --- | --- |
| Fine aggregate | 79.0% |
| Cement | 15.0% |
| Fibers | 0.0% |
| WRA[1] | 0.005% |
| DSRA[2] | 0.005% |
| AEA[3] | 0.005% |
| Lithium | 0.005% |
| Mineral Admixture | 0.0% |
| Silica Fume | 0.0% |
| Water | 6.0% |
| Total | 100.02% |

[1]WRA refers to water reducing additive.
[2]DSRA refers to drying shrinkage reducing additive.
[3]AEA refers to air-entraining admixture

EXAMPLE II

In a second example, the specific formulation is as follows:

| Material | Percentage by Weight |
| --- | --- |
| Fine aggregate | 61.7% |
| Cement | 18.0% |
| Fibers | 5.0% |
| AEA | 0.05% |
| WRA | 0.05% |
| DSRA | 0.05% |
| Lithium | 0.05% |
| Mineral Admixture | 3.5% |
| Silica Fume | 2.6% |
| Water | 9.1% |
| Total | 100.0% |
|  | (100.1%) |

Although the invention has been described above in relation to preferred embodiments thereof, it will be understood by those skilled in the art that variations and modifications can be effected in these preferred embodiments without departing from the scope and spirit of the invention.

What is claimed:

1. A cement repair composition, said composition comprising in weight percentages:
   fine aggregates selected from the group consisting of natural sand, manufactured sand and combinations thereof, 50–80%;
   cement, 10–20%, said cement meeting ASTM C 1157, type GU, "Standard Performance Specification for Blended Hydraulic Cement," with a Blaine fineness, ASTM C 204 of less than 290 square meters per kilogram, a tricalcium silicate content less than 60%, a tricalcium aluminate content of about 6%, and an alkali content less than 0.6%;
   reinforcing fibers selected from the group consisting of carbon fibers, ceramic fibers, polyethylene fibers, steel fibers, and fiberglass fibers, 0–5%; and
   a lithium admixture and at least one further additive, together 0.01–5%
   said at least one further additive comprising one of (i) an air-entraining admixture; (ii) a chemical additive selected from the group consisting of water-reducing admixtures, retarding admixtures, water-reducing retarding admixtures, water-reducing high-range admixtures, and water reducing high-range retarding admixtures, and (iii) a shrinkage compensating chemical additive.

2. The cement repair material composition according to claim 1 wherein said at least one further additive comprises an air-entraining admixture.

3. The cement repair material composition according to claim 2 wherein said at least one further additive further comprises a first chemical additive selected from the group consisting of water-reducing admixtures, retarding admixtures, water-reducing retarding admixtures, water-reducing high-range admixtures, and water-reducing high-range retarding admixtures, and a second shrinkage compensating chemical additive.

4. The cement repair material composition according to claim 3, wherein said second chemical additive comprises a drying shrinkage reducing admixture.

5. The cement repair material composition according to claim 3, wherein
   said fine aggregates are present in an amount by weight from 60% to 80%;
   said cement is present in an amount by weight from 15% to 18%;

said lithium is present in an amount from 0.005% to 0.5%;

said air-entraining admixture is present in an amount from 0.005% to 0.05%;

said first chemical additive is present in an amount from 0.005% to 0.05%; and said second chemical additive is present in an amount from 0.005% to 0.05%.

6. The cement repair material composition according to claim 1, wherein said reinforcing fibers are present in an amount of 1 to 5%.

7. The cement repair material composition according to claim 1, wherein said cement comprises Portland cement.

8. The cement repair material composition according to claim 1, further comprising a mineral admixture.

9. The cement repair material composition according to claim 8, wherein said mineral admixture is selected from the group consisting of coal ash, calcined natural pozzolan, and silica fume.

10. The cement repair material composition according to claim 9, wherein said mineral admixture is present in an amount by weight from 0% to 3.5%.

11. The cement repair material composition according to claim 10 wherein said mineral admixture comprises silica fume.

12. The cement repair material composition according to claim 11 wherein said mineral admixture further comprises a mineral admixture selected from the group consisting of coal ash, raw pozzolans and calcined pozzolans.

13. A cement repair composition for thin concrete, said composition comprising, in percentage by weight:

| | |
|---|---|
| fine aggregate | 79.0% |
| cement | 15.0% |
| fibers | 1.0% |
| air-entraining admixture | 0.005% |
| water reducing additive | 0.005% |
| drying shrinkage reducing additive | 0.005% |
| a lithium admixture | 0.005% |
| water | 6.0%. |

14. A cement repair material composition for thin concrete, said composition comprising, in percentage by weight:

| | |
|---|---|
| fine aggregate | 61.7% |
| cement | 18.0% |
| fibers | 5.0% |
| an air-entraining admixture | 0.05% |
| water reducing additive | 0.05% |
| drying shrinkage reducing additive | 0.05% |
| lithium admixture | 0.05% |
| mineral admixture | 3.5% |
| silica fume | 2.6% |
| water | 9.1%. |

\* \* \* \* \*

UNITED STATES PATENT AND TRADEMARK OFFICE
Certificate

Patent No. 6,858,075 B1                                                                       Patented: February 22, 2005

On petition requesting issuance of a certificate for correction of inventorship pursuant to 35 U.S.C. 256, it has been found that the above identified patent, through error and without any deceptive intent, improperly sets forth the inventorship.
  Accordingly, it is hereby certified that the correct inventorship of this patent is: Kurt F. Von Fay, Morrison, CO (US); William F. Kepler, Golden, CO (US); and Douglas R. Hurcomb, Golden, CO (US).

Signed and Sealed this Second Day of March 2010.

*J. A. LORENGO*
*Supervisory Patent Examiner*
Art Unit 1793